Feb. 2, 1937.  H. BERGSCHICKER  2,069,349
ADJUSTING DEVICE FOR THROTTLE VALVES OF CARBURETORS
Filed Oct. 22, 1935
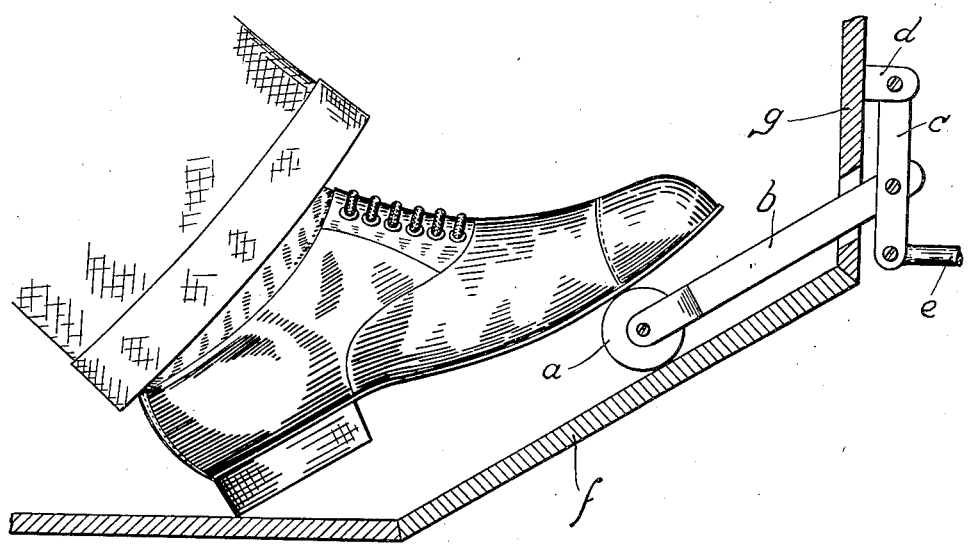
Inventor:
Heinrich Bergschicker Patented Feb. 2, 1937

2,069,349

UNITED STATES PATENT OFFICE 2,069,349

ADJUSTING DEVICE FOR THROTTLE VALVES OF CARBURETORS

Heinrich Bergschicker, Leipzig, Germany

Application October 22, 1935, Serial No. 46,157
In Germany October 25, 1934

2 Claims. (Cl. 74—513)

This invention relates to an adjusting device for the throttle valve of carburetors in combustion engines of motor vehicles, and has for its object to insure convenient and safe operation of the device by the driver and to prevent the drawbacks hitherto connected with similar devices.

This is a device to actuate the throttle valve of carburetors by means of a foot-controlled adjusting member having the form of a roll and stationarily yet rotatably disposed on the floor in front of the driver's seat. The employment of a roll for this purpose affords considerable advantages as compared to the usual gas levers, as the driver need not keep his foot in an unnatural suspended position but may put it on the roll in a natural manner, so that the foot is not subjected to fatigue and the shocks due to poor roads. Furthermore, a foot-controlled member of this type prevents accidents so frequently caused by confusing the brake lever with the gas lever or by slipping of the foot from the braking to the gas lever.

The known devices of this class are open to the objection that during actuation of the roll by the driver's foot not enough power could be developed, as only the radius of the roll was available as a lever arm. The difficulty was that the diameter of the roll cannot exceed a certain degree, because if the roll is too large the foot will occupy again an unnatural and inconvenient position and because the partial arrangement of the roll on the floor is limited by the small space available under the floor of modern motor vehicles.

Besides the frictional resistances of the entire device, the roll has to overcome the resistance of a strong spring which automatically closes the throttle valve. In numerous modern cars the shafts of the throttle valve are further connected with accelerator pumps, carburetor heating means and the like, and in some cars even the starter motor is actuated by the gas pedal. Such arrangements involve resistances which cannot be overcome in a reliable manner by a roll of permissible dimensions, which is stationarily disposed in the floor. In these circumstances sensitive gas control is no longer possible and during vibrations of the car the roll will slip from under the driver's foot owing to too much resistance.

This invention eliminates these troubles by arranging the roll so that it can roll upon the floor.

By way of example, the invention is illustrated in the accompanying drawing which shows a side view of the device, partly in section.

Referring to the drawing, the roll $a$ serving as foot-controlled adjusting member is not stationarily disposed on the floor $f$, but is caused to carry out a rolling motion on the floor and under the driver's foot. The roll $a$ is rotatably arranged in a reciprocating sliding fork $b$ which passes through the dashboard $g$. The sliding forked lever $b$ is articulated to a pendulum lever $c$ to which the motion of the roll $a$ is transmitted by the forked lever. The pendulum lever $c$ is positioned in a bracket $d$ secured to the outside of the board $g$ between the driver's seat and the engine. The connecting rod $e$ transmits the motion of the pendulum lever $c$ to the reciprocating lever of the throttle valve.

In this construction, the lever arm for the transmission of forces does not only comprise the radius but the entire diameter of the roll, so that far greater resistances can be overcome than in case of a stationarily disposed roll and sensitive gas control is insured.

This new construction further affords the advantage that the floor board $f$ may be removed at any time without the least trouble and without necessitating any disassembling between the foot-controlled member and the transmission members thereof. Moreover, the floor board $f$ need not have an opening or passage through which dust can enter.

I claim:—

1. In a foot operated carburetor control for motor vehicles having a floor board, dash, and a reciprocating throttle rod, of a bracket secured to the dash, a swinging lever having one end pivoted therein and its other end pivoted to the throttle link, a forked link extending through the dash with its rear end pivoted to said swinging lever, and a roller journaled in said fork and resting upon the floor board and adapted to be rotated thereon by the driver's foot to impart a reciprocating movement both to the forked link and the throttle rod.

2. In a device for operating a reciprocating throttle rod and in combination with a floor board and a dash, of a swinging lever pivoted to said dash and to the throttle link, of a foot operated link extending through the dash and pivoted to the swinging lever, a fork formed on the outer end of said foot operated link and a roller freely rotatably mounted in said fork and adapted to be rolled upon the floor board by the driver's foot, to impart a reciprocating movement to the foot link.

HEINRICH BERGSCHICKER.